United States Patent [19]
Sawyer

[11] 3,869,625
[45] Mar. 4, 1975

[54] PLURAL AXIS LINEAR POSITION

[76] Inventor: Bruce A. Sawyer, 39 Inverness Rd., Thousand Oaks, Calif. 91360

[22] Filed: May 21, 1973

[21] Appl. No.: 362,119

Related U.S. Application Data

[63] Continuation-in-part of Ser. No. 178,637, Sept. 8, 1971, abandoned.

[52] U.S. Cl.................... 310/12, 310/14, 318/38, 318/115
[51] Int. Cl. ............................................. H02k 41/02
[58] Field of Search .............................. 310/12-14; 318/135, 115, 35, 36, 37

[56] References Cited
UNITED STATES PATENTS

| | | | |
|---|---|---|---|
| 680,797 | 8/1901 | Mershon | 318/115 X |
| 3,441,819 | 4/1969 | Palmero | 318/115 |
| 3,745,433 | 7/1973 | Kelby, Jr. et al. | 318/115 |

OTHER PUBLICATIONS
Meier, "Linear-Rotary Actuator and Transducer for Stick Printer," IBM Tech. Disclosure Bulletin, Vol. 16, No. 2, 7/73.

Primary Examiner—Donovan F. Duggan
Attorney, Agent, or Firm—Ellsworth R. Roston

[57] ABSTRACT

A positioning system for providing a controlled relative movement between two members along at least a first axis including a first cylindrical member, such as a magnetic platen, having an energy configuration formed from ridges of magnetic material to provide a magnetic energy configuration, and with the energy configurations corresponding to the first coordinate axis and with a second member, such as a head disposed for movement relative to the first member along the first coordinate axis and with the second member including electromagnetic means, and with the electromagnetic means selectively energizable for providing forces between the second member and the first member in cooperation with the energy configuration of the first member to provide movement of the second member along the coordinate axis.

18 Claims, 14 Drawing Figures

PATENTED MAR 4 1975  3,869,625
SHEET 1 OF 3
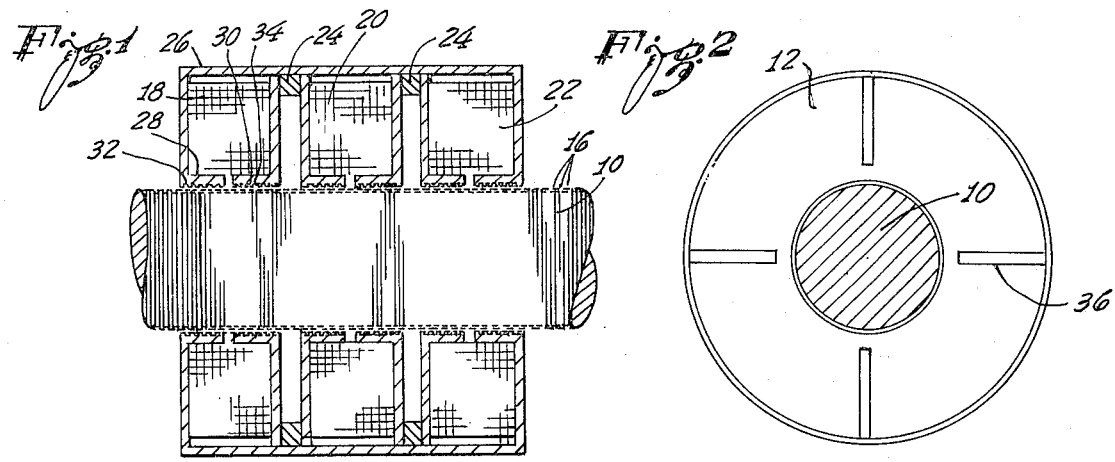
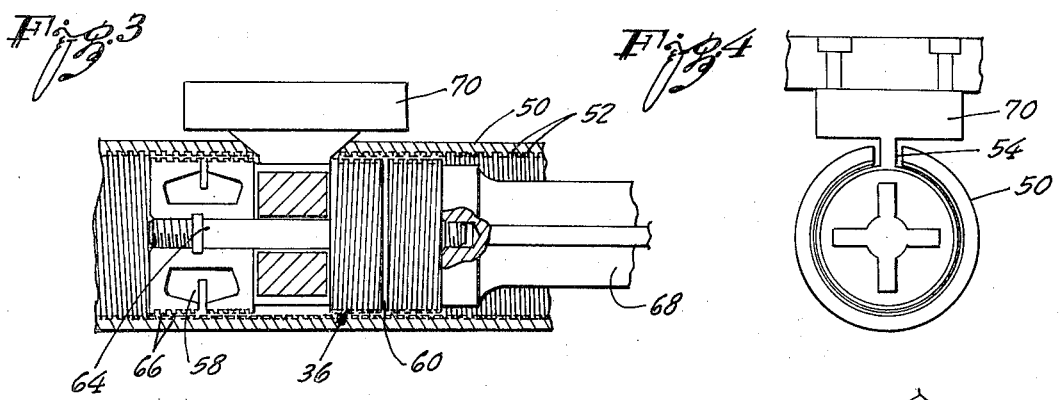
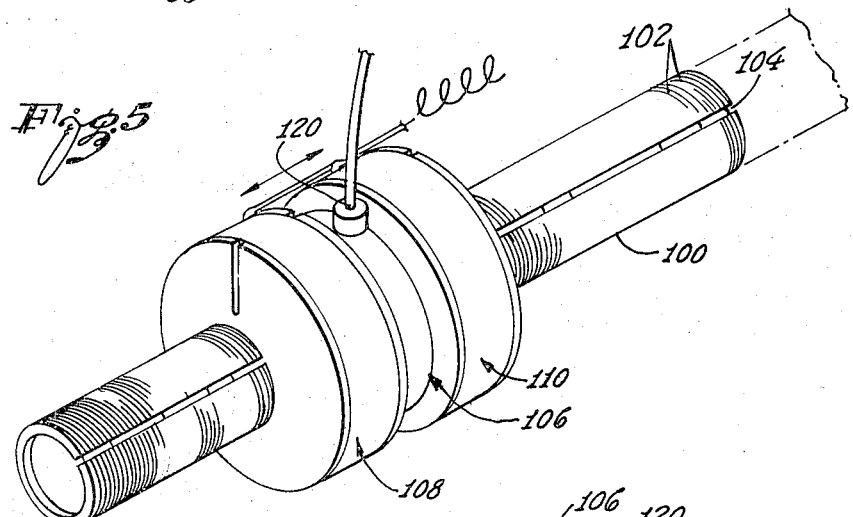
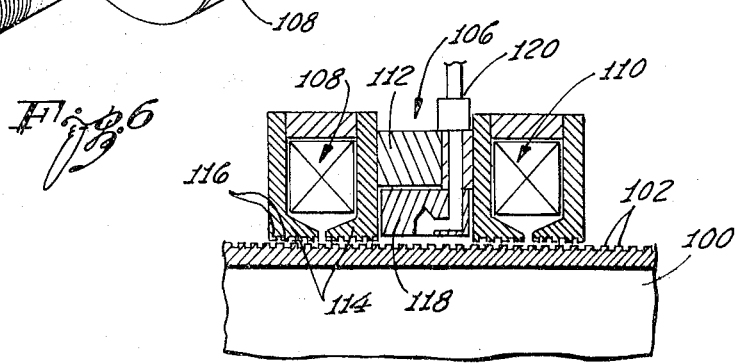

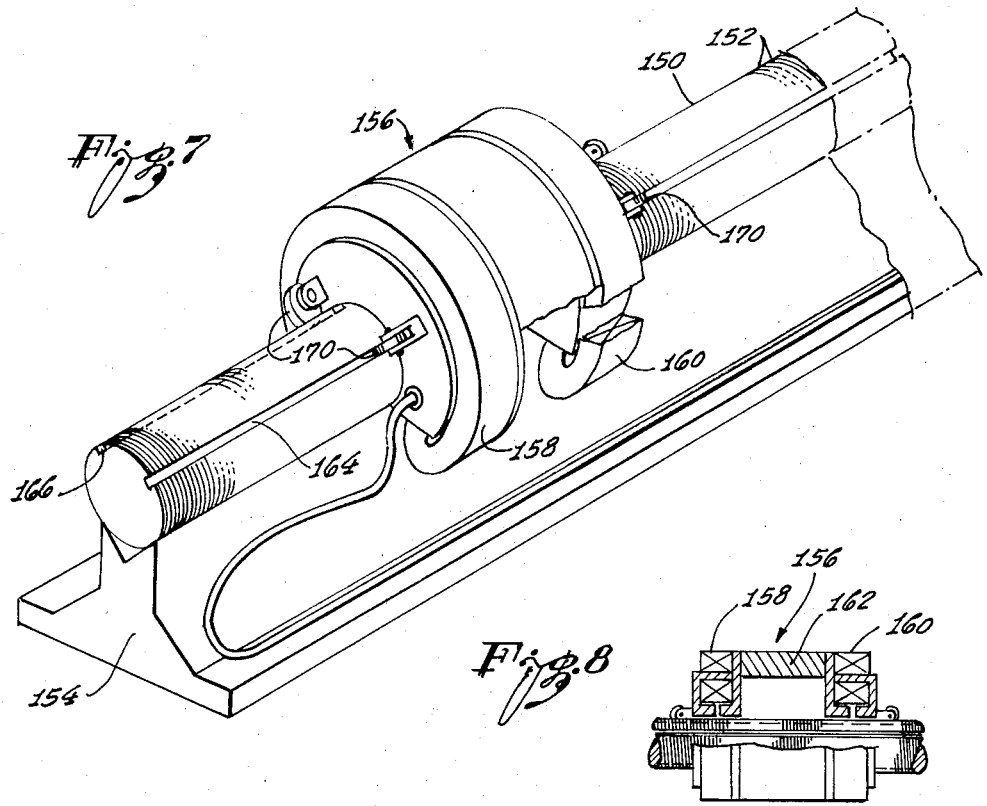
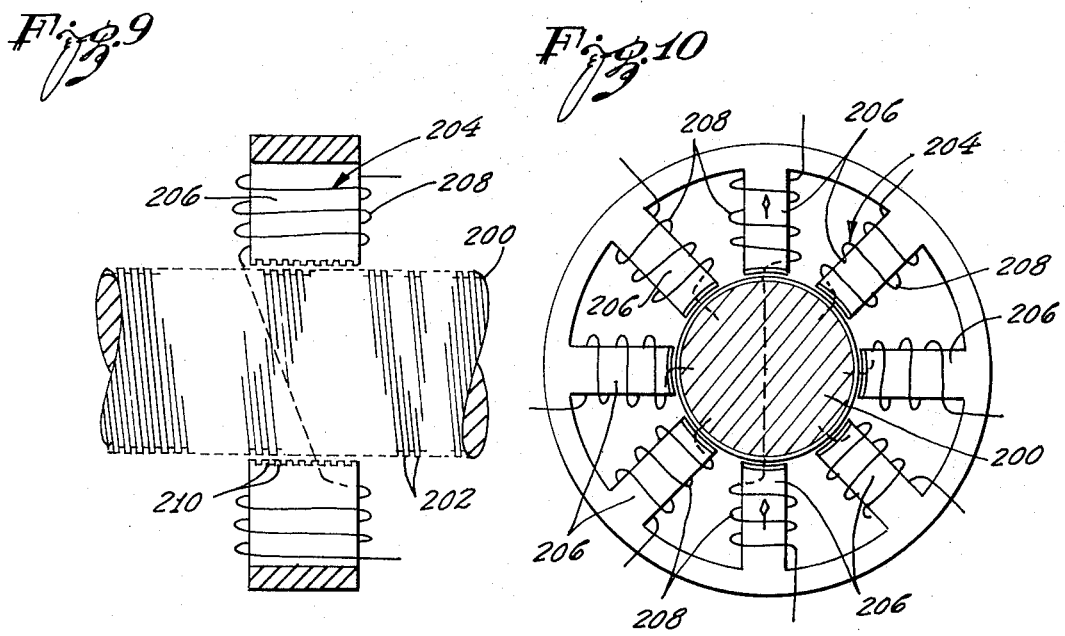

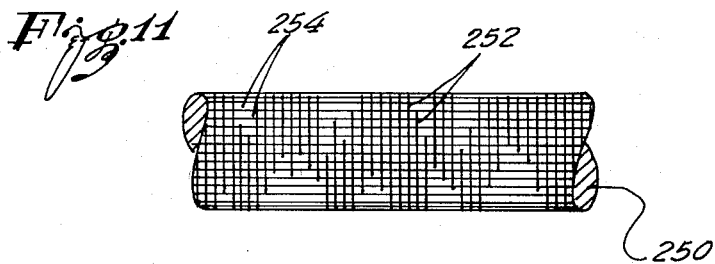
Fig. 11
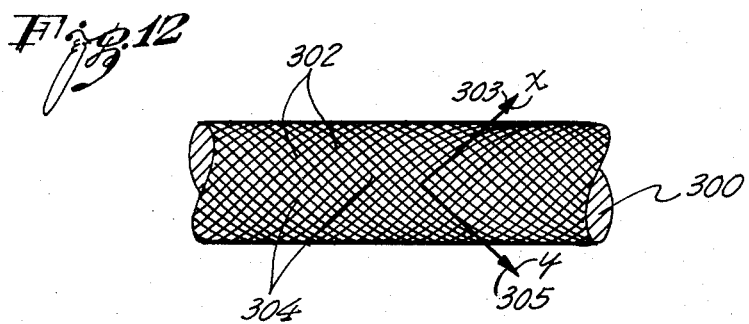
Fig. 12
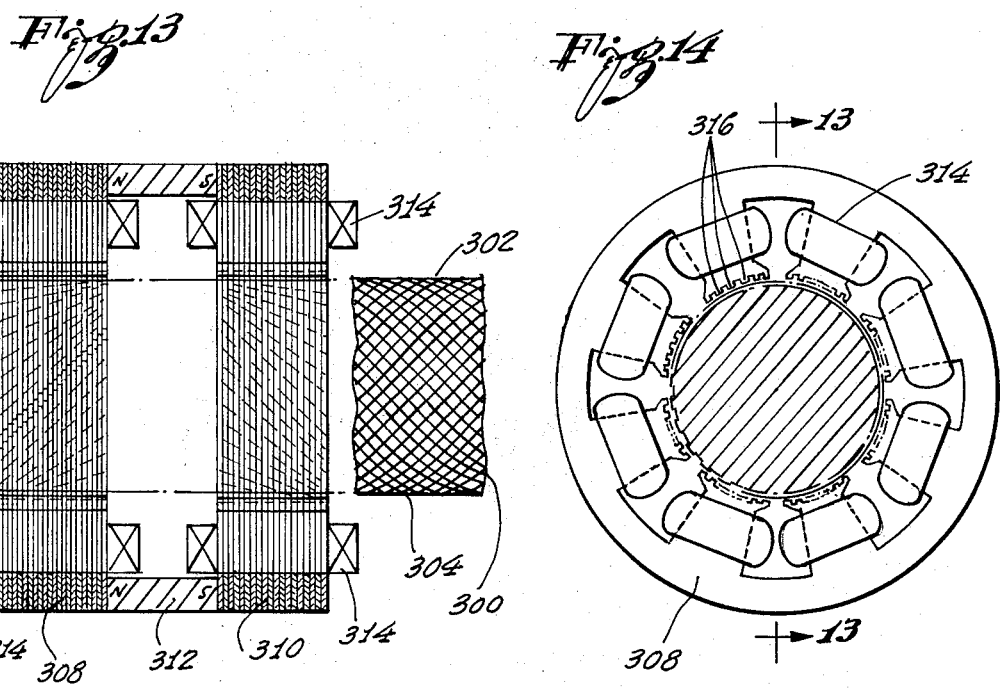
Fig. 13
Fig. 14

PLURAL AXIS LINEAR POSITION

This is a continuation-in-part of application Ser. No. 178,637 filed Sept. 8, 1971, now abandoned.

The present invention is directed to a positioning system providing for a controlled relative movement between a head and a platen. The platen may be formed of material such as magnetic material and may have a pattern of spaced upstanding ridges of magnetic material. In a prior art positioning system, the magnetic platen is formed of a pattern of upstanding teeth of magnetic material to provide for a grid pattern. A head member is located adjacent to the platen and includes corresponding electromagnetic means which, when selectively energized, provide for a magnetic force between the head and the platen to provide a movement of the head relative to the platen. The head may include separate means to provide movement of the head along two coordinate axes relative to the platen. The general type of positioning system described above may be of the type disclosed in U.S. Pat. Nos. Re. 27,289 and Re. 27,436, listing Bruce Sawyer as the inventor, and a control system for selectively energizing the head and providing a controlled movement of the head relative to the platen may be seen with reference to copending U.S. application Ser. No. 36,177, listing Bruce Sawyer as the inventor.

The present invention is an improvement upon the positioning systems described in the above-referenced patents and patent application and reference is hereby made to these patents and patent application for greater detail as to the particular structure and operation of the head, platen and control system.

The present invention is directed to a positioning system where the platen is formed as a cylinder having a particular energy configuration, such as a magnetic configuration, to produce a linear actuator which has several advantages over the prior art devices described above. The cylindrical platen cooperates with separate means in a head member to provide for movement of the head relative to the cylindrical platen along at least the longitudinal axis of the cylindrical platen.

In the positioning system of the present invention, the cylindrical platen contains at least a plurality of ridges of magnetic material which may be formed from parallel ridges or may be formed from a continuous helix. If it is desired to provide movement of the head along two coordinate axes, then the cylindrical platen may be formed with a grid pattern. The grid pattern may be formed from a pair of helixes which are angularly displaced relative to each other. The grid pattern may also be formed from first ridges extending around the cylindrical platen and second ridges extending longitudinally along the cylindrical platen.

The present invention may be applied to cylindrical platens which are formed to provide a variety of platen surfaces. For example, the platen surface may be formed on the outside of the cylindrical member or the platen surface may be formed on the inside of the cylindrical member. In addition, the cylindrical platen is generally formed as a right circular cylinder but it is to be appreciated that the platen may take other cylindrical configurations. Also, the term "cylindrical" as used in this application refers to the platen surface and the platen itself may be formed as a solid or tubular member and may have a variety of cross-sectional configurations.

The present invention may also include the platen having grooves to receive rollers to facilitate the movement of the head member. Also, the structure of the head member may take a variety of shapes and designs. For example, the head member may include electromagnetic means as shown in U.S. Pat. Nos. Re. 27,289 and Re. 27,436. In addition, the head member may include poles radially displaced around the cylindrical platen and with one or both of the head and platen including threads and the other including parallel ridges so that the head would move relative to the platen in accordance with the pitch difference between the platen and the individual ones of the poles of the head as the poles are energized.

In other embodiments of the invention, the cylindrical platen may be formed with a grid pattern to provide both longitudinal and rotational movement between the head and platen. This grid pattern may be formed from longitudinal and circular ridges or from helical ridges or from combinations of the above. When the platen is formed from helical ridges, the head member may be formed from laminations which are skewed so as to match the helical ridges.

The present invention has several advantages over the systems shown in the prior art patents and application. In the present invention, the use of a cylindrical platen provides for a greater surface area so as to provide for a greater force between the head and the platen. In addition, the use of a cylindrical platen allows for the platen to be constructed from a tube which provides for a very stiff and rigid structure. Also, the cylindrical platen may be easily fabricated and the ridges may be very simply formed by threading the cylindrical platen.

The use of this cylindrical platen does provide for many different configurations as described above, and a clearer understanding of the invention will be had with reference to the following description and drawings, wherein:

FIG. 1 illustrates a first embodiment of the invention including a cylindrical platen having parallel ridges and with a head member surrounding the cylindrical platen;

FIG. 2 illustrates an end view of the embodiment of FIG. 1;

FIG. 3 illustrates a second embodiment of the invention including a platen located on the interior of the cylindrical member and including ridges formed from a continuous helix and with the head member located within the cylindrical platen;

FIG. 4 illustrates an end view of the embodiment of FIG. 3;

FIG. 5 illustrates a modification of the first embodiment of the invention wherein the platen includes ridges formed from a continuous helix;

FIG. 6 illustrates a cross-section of the head and platen of the embodiment of FIG. 5;

FIG. 7 illustrates another modification of the first embodiment of the invention where the platen includes longitudinal grooves to receive rollers mounted on the head;

FIG. 8 illustrates a partially cut-away and partially cross-section of the embodiment of FIG. 7;

FIG. 9 illustrates a third embodiment of the invention where the head is formed with a plurality of radial pole members;

FIG. 10 is an end view of the embodiment of FIG. 9;

FIG. 11 illustrates a fourth embodiment of the invention illustrating a cylindrical platen with a grid pattern formed from longitudinal ridges and circular ridges to form a waffle pattern;

FIG. 12 illustrates a fifth embodiment of the invention illustrating a cylindrical platen with a grid pattern formed from a pair of helical ridges;

FIG. 13 illustrates the fifth embodiment of the invention showing a head member formed from skewed laminations; and FIG. 14 illustrates an end view of the embodiment of FIG. 13.

FIG. 1 illustrates a first embodiment of the invention including a cylindrical platen 10 and a head member 12. The platen 10 may be a rod or tubular member but includes at its outer surface a plurality of spaced ridges 16 which are formed as parallel rings. In the specification, the term "ridge" refers to an upwardly extending portion of the platen which is used to provide a magnetic energy configuration. The ridges may be separated by air or may be separated by an insulating material so that the outer surface of the platen is flush.

The head member 12 surrounds the cylindrical platen 10 and is concentric with the cylindrical platen 10 and extends along a length of the cylindrical platen. In the embodiment of FIG. 1, the head member 12 is shown to include three electromagnetic means 18, 20 and 22 which are spaced by tube and spacers 24. Each electromagnetic means 18, 20 and 22 includes coils such as coil 26 as shown with reference to electromagnet 18, and has pole faces such as pole faces 28 and 30 which have ridges such as ridges 32 and 34 which correspond with the ridges 16 of the cylindrical platen 10. As shown in FIG. 2, the electromagnetic means include slots 36 which are used to prevent a short circuit from being induced in the iron portion of the electromagnet.

The movement of the head member 12 relative to the cylindrical platen 10 using selective energization of the electromagnets 18, 20 and 22, is substantially the same as that shown with reference to U.S. Pat. No. Re. 27,436 referred to above, and such selective energization forms no part of the present invention. The structure of the particular embodiment of the invention shown in FIGS. 1 and 2 has several advantages over the structure of the positioning device shown in the prior art patent, specifically when used to provide for a longitudinal movement which is similar to the movement of a lead screw. For example, the embodiment of FIGS. 1 and 2 is relatively simple to make and could be constructed of a tubular member for the cylindrical platen 10, which is very stiff. Also, the use of the cylindrical platen provides for greater surface area to produce a greater force between the head 12 and the cylindrical platen 10. The cylindrical platen 10 could be fairly easily fabricated using turning operations and even the head member 12 could be fairly easily fabricated as a brazed assembly. It is to be appreciated that a cylindrical fluid support bearing could be integral with the head member 12 and operate substantially in a similar manner as that shown in the prior art patent referred to above.

FIGS. 3 and 4 illustrate a second embodiment of the invention which is inside-out when compared with the embodiment of FIGS. 1 and 2. In the embodiment of FIGS. 3 and 4, a cylindrical platen 50 includes ridges 52 located on an inside surface. The ridges 52 may be formed from parallel rings as shown in FIG. 1 or may be formed as a continuously threaded groove, which would be substantially perpendicular to the longitudinal axis of the cylindrical platen 50. If the ridges are formed of a continuous helix, and in order to prevent short circuit currents, a slot such as slot 54 shown in FIG. 4 is used.

A head member 56 includes first and second electromagnetic means 58 and 60 and with a permanent magnet 62 located therebetween. The electromagnets 58 and 60 may be mounted on a threaded rod 64 so as to provide for final adjustment of the pole faces of the electromagnet relative to the ridges 52 of the cylindrical platen 50. The electromagnets include pole faces such as pole faces 66 which are used in combination with the ridges 52 and with the selective energization of the electromagnets to provide for movement of the head member 56 relative to the cylindrical platen 50.

The particular energization of the electromagnets 58 and 60 would be in accordance with the positioning system shown in U.S. Pat. No. Re. 27,289, but it is to be appreciated that the particular construction and number of electromagnets may also be of the type shown in FIGS. 1 and 2.

The head member 56 may be mounted at the end of a push rod 68 and/or may be mounted on a boss 70 which extends through the slot 54. The boss 70 may be mounted to an external load or may be permanently attached to a beam and with the cylindrical member 50 moving relative to the head member 56.

FIGS. 5 and 6 show a modification of the first embodiment of the invention as shown in FIGS. 1 and 2 but using a threaded cylindrical platen and a head member which is of the type shown in the embodiment of FIGS. 3 and 4. Specifically, in FIGS. 5 and 6 the cylindrical platen 100 includes ridges 102 formed by a helical thread and with the cylindrical platen 100 including an anti-shorting cut 104. A head member 106 includes a first and second electromagnets 108 and 110 separated by a permanent magnet 112. The pole faces of the electromagnet such as pole faces 114 of the electromagnet 108 include ridges 116 which correspond to the ridges 102 of the cylindrical platen 100. The head member may also include an air bearing 118 and with a supply of air through opening 120. Upon selective energization of the electromagnets 108 and 110, relative movement is provided between the head member 106 and the cylindrical platen 100.

The embodiment of FIGS. 5 and 6 may also have a fine adjustment by rotating the cylindrical platen 100. When the cylindrical platen 100 is rotated, this would move the ridges 102 less than one thread pitch so as to provide for a fine adjustment less than one thread pitch. This rotation could either be mechanical or could be accomplished using additional longitudinal ridges intersecting the ridges 102 and with additional electromagnetic means in the head member 106.

FIGS. 7 and 8 show a further modification of the first embodiment of the invention using roller members which roll in longitudinal grooves so as to provide for a free movement of the head member relative to the cylindrical platen. Specifically, in FIGS. 7 and 8 a cylindrical platen 150 includes ridges 152 which may either be formed by a continuous helical thread or by a plurality of parallel grooves and with the cylindrical platen mounted on a support member 154.

A head member 156 includes first and second electromagnets 158 and 160 and the head member is of the type shown in FIGS. 5 and 6 and in U.S. Pat. No. Re. 27,289. The head member substantially surrounds the cylindrical platen 150 but not completely, due to the shaft support member 154. The head member includes pole faces, which pole faces have ridges substantially similar to those shown in FIGS. 5 and 6. In addition, the electromagnets 158 and 160 are separated by a permanent magnet 162.

In order to provide for free movement of the head member 156 relative to the cylindrical platen 150, the cylindrical platen 150 includes a pair of grooves 164 and 166, which grooves receive pairs of identical rollers 170 mounted on each side of the head member 156. It can be seen, therefore, that upon selective energization of the electromagnetic means 158 and 160, relative movement is provided between the head member 156 and the cylindrical platen 150 and with the rollers 170 riding in the grooves 164 and 166 providing for a free movement between the head and the platen.

FIGS. 9 and 10 illustrate a third embodiment of the invention using a cylindrical platen 200 which includes ridges 202. The ridges may be formed from a continuous helix or from parallel grooves, but either the platen or a head 204 must be threaded relative to the other.

The head 204 includes a plurality of radially disposed poles and windings 208, which pole faces include ridges 210. As indicated above, either the cylindrical platen 200 or the various pole members 206 of the head 204 includes a helical thread and actually both members could be threaded. The various electromagnetic means formed by the windngs 208 and poles 206 may then be selectively energized and the pitch difference between the ridges 202 of the cylindrical platen 200 and 210 of the pole pieces 206 would thereby provide the proper average displacement. Continuous energization would produce the relative movement between the head and the cylindrical platen. The windings 208 may be actually formed as pairs with each pair including the windings located on poles located along the same diameter. Also, the structure shown in FIGS. 9 and 10, and specifically the use of this pole stepper, lends itself very easily to the use of a laminated structure.

FIGS. 11 and 12 illustrate two embodiments of a cylindrical platen which provide for movement of a head along two coordinate axes. For example, in FIG. 11 a cylindrical platen 250 may include ridges 252 which are substantially perpendicular to the longitudinal axis of the cylindrical platen and ridges 254, which are substantially parallel to the longitudinal axis of the cylindrical platen 250. It can be seen, therefore, that the two groups of ridges are intersecting and that a head member, when constructed with the proper electromagnetic means of the type shown either in U.S. Pat. No. Re. 27,289 or U.S. Pat. No. Re. 27,436 and conforming to the outer configuration of the cylindrical platen 250 in the manner shown with reference to FIGS. 1 or 5 may provide for relative movement between the head member and the cylindrical platen 250 in both a longitudinal and a rotational axis.

FIG. 12 illustrates another embodiment of a cylindrical platen, such as cylindrical platen 300, which includes ridges formed of intersecting helixes 302 and 304. If we designate the movement using the ridges formed by the helix 304 to be in an X direction designated by the arrow 303 and a movement using the ridges formed by the helix 302 to be in a Y direction as designated by the arrow 305, then it is possible to get both longitudinal displacement of the head member by energizing electromagnets to add the X movement to the Y movement and to get rotary displacement of the head member by energizing electromagnets to subtract the Y movement from the X movement. This type of system may be seen in more detail with reference to FIGS. 13 and 14 where the cylindrical platen 300 is illustrated with the intersecting helixes 302 and 304.

In FIGS. 13 and 14, a head member 306 may be formed from two groups of skewed laminations 308 and 310. The laminations 308 may have a righthand skew, and the laminations 310 may have a lefthand skew and with the two groups of laminations 308 and 310 separated by a ring magnet 312. Each group of skewed laminations includes coil members 314 so that selective energization of the laminations may be provided to produce relative movement between the head member 306 and the cylindrical platen 300. As can be seen in FIG. 14, the innerfaces of the skewed laminations include ridges 316 which correspond to the ridges formed on the cylindrical platen 300 by the intersecting helixes 302 and 304. The relative movement between the head member 308 and the cylindrical platen 300 may be accomplished along two coordinate axes in the manner described with reference to FIG. 12 using selective energization of the electromagnetic means of the head member 306. The structure of FIGS. 13 and 14 is relatively easy to construct since the laminations forming the electromagnetic means may be stacked and with the skewing accomplished using a jig. The cylindrical platen 300 may be formed by turning the helixes 302 and 304 in the surface of a rod or tube member.

The present invention is therefore directed to a positioning device using a cylindrical platen which provides for a rigid structure and a greater surface area and therefore greater force than could be accomplished with prior art devices.

Although the application has been described with reference to particular adaptations and modifications, the inventions is only to be limited by the appended claims.

I claim:

1. A positioning system for providing a controlled relative movement between two members along at least a first longitudinal axis and a second cylindrical axis angularly displaced relative to the first longitudinal axis, including a first member forming a cylindrical platen having at least a first plurality of first and second portions alternately disposed relative to one another and extending in a first direction having a major component in the longitudinal direction and displaced relative to one another in a second direction having a major component in the angular direction, a second member disposed adjacent to the first member along the surface of the first plurality of first and second portions of the cylindrical platen for movement relative to the first member in the second direction, first means cooperative with the first portions in the first plurality for producing a force between the second member and the first portions on the first member to provide a displacement of the second member relative to the first member in the second direction, and a second plurality of first and second portions included in the first member and intersecting the first plurality of first and second portions and alternately disposed relative to one another and extending in the second direction and disposed in spaced relationship to one another in the first direction, and second means included in the second member for producing a force between the second member and the first portions in the second plurality to provide a displacement of the second member relative to the first member in the first direction.

2. The positioning system of claim 1 wherein the first and second portions in the first plurality extend parallel to one another in the first direction and are displaced from one another in the second direction and the second ridges extend substantially parallel to one another in the second direction and are displaced from one another in the first direction.

3. The positioning system of claim 1 wherein the first and second portions in the first plurality are formed as intersecting helixes relative to the first and second portions in the second plurality.

4. The positioning system of claim 1 wherein the first member is formed as a right circular cylinder having the first and second portions in the first and second pluralities at an external position and the second member substantially envelopes the first member and the first means includes portions in cooperative relationship with the first portion in the first plurality to produce a force for displacing the second member relative to the first member in the second direction and the second means includes portions in cooperative relationship with the first portions in the second plurality to produce a force for displacing the second member relative to the first member in the first direction.

5. The positioning system of claim 1 wherein the first member is formed as a tubular member and the first and second portions in the first and second pluralities are located on the inside surface of the tubular member and the second member is located within the tubular member and the first means includes portions in cooperative relationship with the first portions in the first plurality to produce a force for displacing the second member relative to the first member in the second direction and the second means includes portions in cooperative relationship with the first portions in the second plurality to produce a force for displacing the second member relative to the first member in the first direction.

6. The positioning system of claim 1 wherein the first and second portions in the first plurality are parallel to one another and extend in the longitudinal direction and the first and second portions in the second plurality are parallel to one another and substantially perpendicular to the first and second portions in the first plurality and extend in the angular direction and the first portions in the first and second pluralities are magnetic and the first means cooperate magnetically with the first portions in the first plurality to produce a force for displacing the second member relative to the first member in the angular direction and the second means cooperate magnetically with the first portions in the second plurality to produce a force for displacing the second member relative to the first member in the longitudinal direction.

7. The positioning system of claim 1 wherein the first and second portions in the first plurality are formed to define a helix extending in the first direction and the first and second portions are formed to define a helix extending in the second direction.

8. The positioning system of claim 7 wherein the first means of the second member include a plurality of poles angularly disposed relative to one another and individually disposed relative to the first portions in the first plurality and associated with individual ones of first windings energizable in a sequence to provide a displacement of the second member relative to the first member in the angular direction and wherein the second means of the second member include a plurality of poles longitudinally disposed relative to one another and individually disposed relative to the first portions in the second plurality and associated with individual ones of second windings energizable in a sequence to provide a displacement of the second member relative to the first member in the longitudinal direction.

9. A positioning system for producing a controlled relative movement between a head and a cylindrical platen along at least a first longitudinal axis and a second axis angularly displaced relative to the first axis, including a cylindrical magnetic platen having at least a first magnetic configuration formed by a plurality of first and second magnetic portions alternately disposed relative to one another and extending in a first direction having a major component corresponding to the longitudinal axis and angularly displaced relative to one another in a second direction having a major component corresponding to the angular direction, and a cylindrical head positioned adjacent to the cylindrical platen and concentric with the cylindrical platen for movement relative to the platen along the longitudinal axis and in the angular direction, first magnetic means disposed on the cylindrical head for producing a magnetic force between the head and the first portions in the first plurality to provide a movement of the head relative to the platen in the first direction, and a second plurality of first and second portions provided on the magnetic platen and intersecting the first plurality of first and second portions and having first and second magnetic portions alternately disposed relative to one another and extending in the second direction and displaced relative to one another in the first direction, and second magnetic means disposed on the head for producing a magnetic force between the head and the first portions in the second plurality on the platen to provide a displacement of the head relative to the magnetic platen in the first direction.

10. The positioning system of claim 9 wherein the first and second portions in the first plurality extend in a direction corresponding to the longitudinal axis and are spaced in the angular direction and the first and second portions in the second plurality extend in the angular direction and are spaced from one another in a direction corresponding to the longitudinal axis.

11. The positioning system of claim 9 wherein the first and second ridges are formed as intersecting helixes.

12. The positioning system of claim 9 wherein the magnetic platen is formed as a cylinder having the first and second portions in the first plurality at an external position and the head substantially envelopes the first and second portions in the first and second pluralities of the magnetic platen with the first means disposed in contiguous relationship to the first portions in the first plurality and the second means disposed in contiguous relationship to the first portions in the second plurality.

13. The positioning system of claim 9 wherein the magnetic platen is formed as a tubular member and the first and second portions in the first and second plurality are located on an interior surface of the tubular member and the head is located within the tubular member with the first means disposed in contiguous relationship to the first portions in the first plurality and the second means disposed in contiguous relationship to the first portions in the second plurality.

14. The positioning system of claim 9 wherein the first means are provided with a first plurality of magnetic poles individually disposed relative to the first portions in the first plurality and are provided with a first plurality of windings individually associated with the poles in the first plurality and energizable in a sequence to produce a magnetic force for providing a displacement of the head relative to the platen in the second direction and wherein the second means are provided with a second plurality of magnetic poles individually disposed relative to the first portions in the second plurality and are provided with a second plurality of windings individually associated with the poles in the second plurality and energizable in a sequence to produce a magnetic force for providing a displacement of the head relative to the platen in the second direction.

15. The positioning system of claim 14 wherein the first and second portions in the first plurality are defined by a helix extending in the first direction along the axial length of the magnetic platen and the first and second portions in the second plurality are defined by a helix extending in the second direction along the angular periphery of the magnetic platen.

16. A positioning system providing a controlled relative movement between a head and a cylindrical platen along first and second coordinate axes having a polar relationship to each other, including a cylindrical platen having first and second groups of intersecting portions defining a grid configuration corresponding to the first and second coordinate axes with the portions in each group being defined by first areas providing a first energy level and second areas providing a second energy level different from the first energy level, and a head positioned adjacent to the platen and concentric with the cylindrical platen for movement relative to the cylindrical platen along the first and second coordinate axes and with the head including first means for providing a force between the head and the first and second groups of intersecting portions in a first direction having a major component along the first coordinate axis to provide a movement of the head relative to the platen in the first direction and further including second means for providing a force between the head and the first and second groups of intersecting portions in a second direction having a major component along the second coordinate axis to provide a movement of the head relative to the platen in the second direction, third means cooperative with the first means for energizing the first means to obtain the production of the forces for providing a movement of the head relative to the platen in the first direction, and fourth means cooperative with the second means for energizing the second means to obtain the production of the forces for providing a movement of the head relative to the platen in the second direction.

17. The positioning system of claim 16 wherein the first group of intersecting portions extends along the first coordinate axis and the second group of intersecting portions extends along the second coordinate axis.

18. The positioning system of claim 16 wherein the first and second groups of intersecting portions are defined by intersecting helixes.

* * * * *